Figure 1:
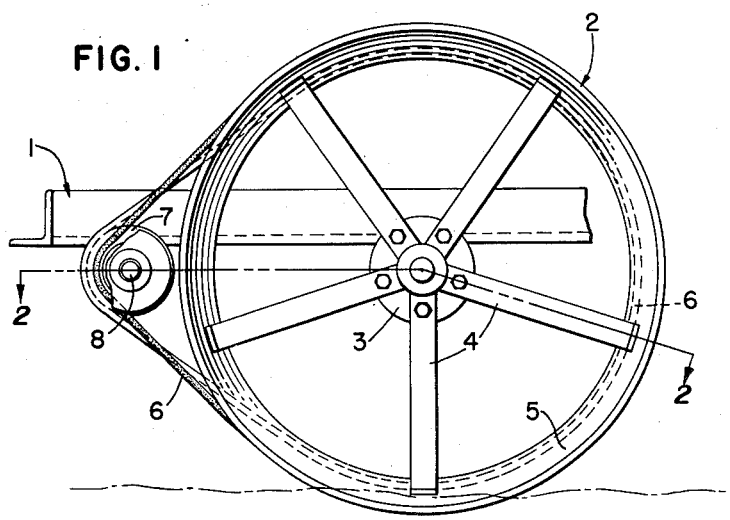

July 29, 1952     J. D. BERWICK     2,604,836

PRESS WHEEL FOR FARM PLANTER

Filed May 3, 1949

Inventor
JO D. BERWICK

R. H. Waters

By

ATTORNEY

Patented July 29, 1952

2,604,836

UNITED STATES PATENT OFFICE 2,604,836

PRESS WHEEL FOR FARM PLANTER

Jo D. Berwick, Chicago, Ill., assignor to Wingfoot Corporation, Akron, Ohio, a corporation of Delaware Application May 3, 1949, Serial No. 91,079

6 Claims. (Cl. 97—56)

1

The present invention relates to a mechanism for keeping the operating surfaces of a packing wheel for a corn planter or the like free of foreign matter so that it will function properly.

More particularly, the invention has for its object the provision of a belt adapted to be trained over the operating surfaces of a packing wheel and so mounted as to be flexed longitudinally and also transversely as it leaves the packing wheel so as to cause a release of foreign material adhering to the belt whereby, when the belt surface again engages the ground, it is free of foreign material and permits operation of the packing wheel as intended.

When planting crops such as corn and the like, the planter moves along and plows up the ground to form a trench into which the seeds are dropped and, after the seeds are dropped in the trench, the trench is covered over and the ground is packed to make positive intimate contact of seed with soil—thus fostering early germination. This packing is usually accomplished by a wheel which has two axially spaced portions which comprise conical flanges supported on the hub of the wheel. This provides an open space at the middle section of the wheel for dirt to be discharged rather than to have a wheel with a non-open center because, with that type of a wheel, the dirt tends to accumulate on the wheel and build up. Even with open center packing wheels the mud will accumulate on the surface and build up, thus impairing the efficiency of the wheel. Therefore, it is a primary purpose of this invention to provide means for always presenting the same type of a surface to the ground to effect the packing operation.

Figure 2:
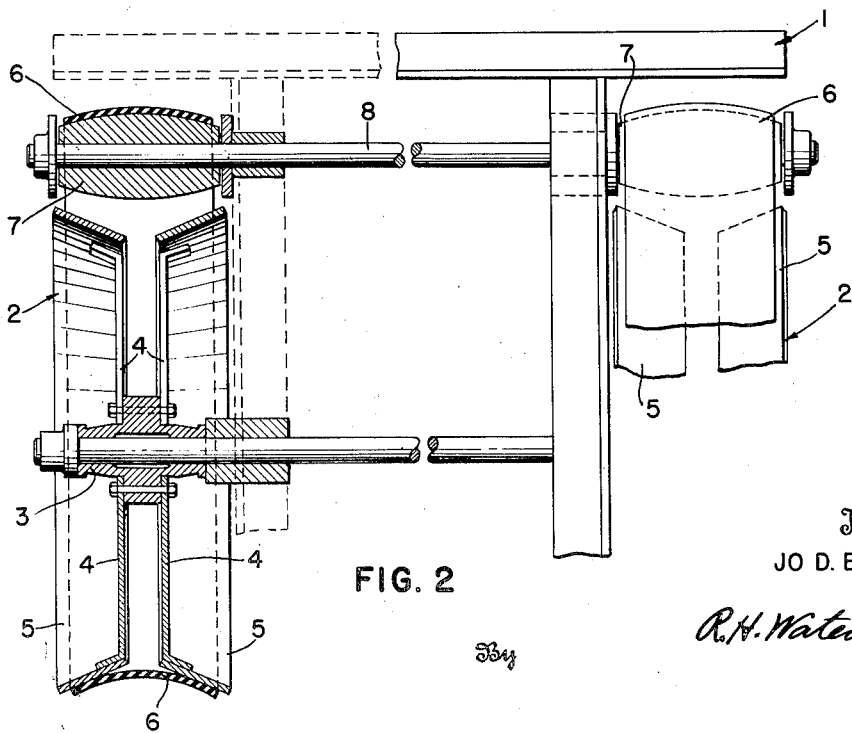

One form of the invention is shown in the drawings, in which:

Fig. 1 is a side elevation of the invention as applied to a farm implement employing a packing wheel; and Fig. 2 is a plan view of the device shown in Fig. 1 with the left side of the view in section taken substantially along the line 2—2 of Fig. 1.

The reference character 1 indicates the frame of a vehicle, such as a corn planter, on which there is a rotatably mounted packing wheel generally designated by the reference character 2. This is usually a freely rotatable wheel which is rotated by its engagement with the ground and it is so mounted as to be constantly in engagement with the ground during the planting operation. The wheel comprises a hub 3, spokes 4 and a pair of oppositely-facing conical rim members 5 mounted on the ends of the spokes. The outer

2 surfaces of the members 5 are the surfaces which normally engage the ground and pack the soil over the seeds.

In order to present the same type of surface to the ground at all times, the invention contemplates the use of a flat belt 6 which is trained over the surfaces of the rim 5 and over an idler 7 mounted on a shaft 8 carried by the frame 1. The idler 7, as best illustrated in Fig. 2, is crowned so that as the belt passes over the idler 7 it has a transverse curvature which is convex outwardly, whereas as it passes over the wheel it is concave outwardly. In between these positions the transverse shape of the belt becomes alternately concave and convex. During this change from concave to convex transverse shape, any mud which may have accumulated on the surface of the belt is freed from the belt due to the flexing action of the belt. Note also that the belt also changes its shape in a longitudinal direction as it leaves the wheel because it leaves the circular periphery of the wheel and then has a straight run to the idler 7.

Thus, it will be seen that the belt will keep the periphery of the wheel clean at all times and the wheel will function efficiently to accomplish its purposes. The belt need not be of uniform cross section and may be reinforced at the center so as to resist being forced into the space between the cone-shaped members 5.

While I have illustrated one form of the invention, it will be apparent to those skilled in the art that various changes and modifications may be made therein without departing from the spirit or scope of the invention.

Having thus fully described my invention, what I claim and desire to secure by Letters Patent of the United States is:

1. In combination, a vehicle, a ground-engaging packing wheel mounted on said vehicle, a support on said vehicle spaced from said wheel, a belt trained over the surface of the packing wheel and said support, whereby upon rotation of the wheel the belt will travel over the surface of the wheel and said support, the wheel and support having the belt-engaging surface of such different cross-sectional shapes that the flat belt in the reaches thereof between said wheel and support changes its transverse shape to flex the belt and cause loosening of any foreign material thereon.

2. In combination, a vehicle, a ground-engaging packing wheel mounted on said vehicle, a pulley rotatably mounted on said vehicle, a belt trained over the surface of the packing wheel and said pulley, whereby upon rotation of the wheel the belt will travel over the surface of the wheel and said support, the wheel and pulley having the belt-engaging surfaces of such different cross-sectional shapes that the flat belt in the reaches thereof between said wheel and pulley changes its transverse shape to flex the belt and cause loosening of any foreign material thereof.

3. In combination, a vehicle, a ground-engaging packing wheel mounted on said vehicle, a pulley rotatably mounted on said vehicle, a belt trained over the surface of the packing wheel and said pulley, whereby upon rotation of the wheel the belt will travel over the surface of the wheel and said pulley, the wheel having the periphery shaped to cause the belt to be concave outwardly when traveling over said wheel and said pulley being crowned to cause a transverse reverse flexing of the belt in its travel.

4. In combination, a vehicle, a packing wheel mounted on said vehicle having the face thereof diverging from the center of the periphery to the outer edges of the wheel, an idler mounted on said vehicle and a belt trained over said wheel and idler, said idler being shaped to give a substantially different cross-section to the belt as the belt passes over the idler.

5. In combination, a vehicle, a ground-engaging wheel having the periphery thereof sloping outwardly and axially from the center of the periphery thereof, an idler having the surface thereof of a distinctly different cross-section to that of the cross section of the outer periphery of said wheel and a belt trained over the periphery of the wheel and the idler, whereby the belt is flexed laterally and longitudinally as it leaves the wheel to loosen packed ground material that may adhere thereto.

6. In combination, a vehicle, a packing wheel mounted on said vehicle, an idler mounted on said vehicle, and a belt trained over said idler and wheel, the outer periphery of the wheel being generally concave and open at the center and the idler being generally convex.

JO D. BERWICK.

REFERENCES CITED

The following references are of record in the file of this patent:

UNITED STATES PATENTS

| Number | Name | Date |
|---|---|---|
| 1,217,442 | Gunther et al. | Feb. 27, 1917 |
| 1,604,721 | Riepe | Oct. 26, 1926 |